(12) United States Patent
Dalke

(10) Patent No.: US 9,975,504 B2
(45) Date of Patent: May 22, 2018

(54) REMOTE CONTROL OF A MOTOR VEHICLE DURING A PARKED PHASE

(71) Applicant: Audi AG, Ingolstadt (DE)

(72) Inventor: Christoph Dalke, Kipfenberg (DE)

(73) Assignee: Audi AG, Ingolstadt (DE)

(*) Notice: Subject to any disclaimer, the term of this patent is extended or adjusted under 35 U.S.C. 154(b) by 0 days. days.

(21) Appl. No.: 15/303,508

(22) PCT Filed: Apr. 17, 2015

(86) PCT No.: PCT/EP2015/000808
§ 371 (c)(1),
(2) Date: Oct. 11, 2016

(87) PCT Pub. No.: WO2015/185172
PCT Pub. Date: Dec. 10, 2015

(65) Prior Publication Data
US 2017/0129425 A1 May 11, 2017

(30) Foreign Application Priority Data
Jun. 7, 2014 (DE) .................. 10 2014 008 478

(51) Int. Cl.
*B60R 16/03* (2006.01)
*H04L 29/08* (2006.01)
(Continued)

(52) U.S. Cl.
CPC ............ *B60R 16/03* (2013.01); *B60R 25/209* (2013.01); *B60R 25/2018* (2013.01);
(Continued)

(58) Field of Classification Search
None
See application file for complete search history.

(56) References Cited

U.S. PATENT DOCUMENTS 7,336,943 B2 2/2008 Crocker et al.
7,801,540 B2 9/2010 Jamali et al.
(Continued)

FOREIGN PATENT DOCUMENTS

CN 102955453 A 3/2013
DE 102004055293 A1 6/2005
(Continued)

OTHER PUBLICATIONS

GSMArena, GPRS, Apr. 2013, p. 1, https://web.archive.org/web/20130424124434/http://www.gsmarena.com/glossary.php3?term=gprs.*
(Continued)

*Primary Examiner* — John Olszewski
*Assistant Examiner* — David P. Merlino
(74) *Attorney, Agent, or Firm* — Sterne, Kessler, Goldstein & Fox, PLLC

(57) ABSTRACT

The invention relates to a control unit for a motor vehicle, wherein the control unit is configured to switch off, upon reception of an ignition-off signal transmitted in the motor vehicle for initiating a parked phase, a main module provided for operation with ignition switched on. It is the object of the invention to provide a remote service with low latency during the parked phase. For this purpose, in the control unit, a mobile radio module is provided, which is configured so that it remains logged into a mobile radio network with the main module switched off. An auxiliary processor device is configured to reserve an Internet address on an address server of the Internet via the mobile radio module, and to store the Internet address on a control server of the Internet, which is configured for the remote control of the motor vehicle.

21 Claims, 1 Drawing Sheet

Figure 1:
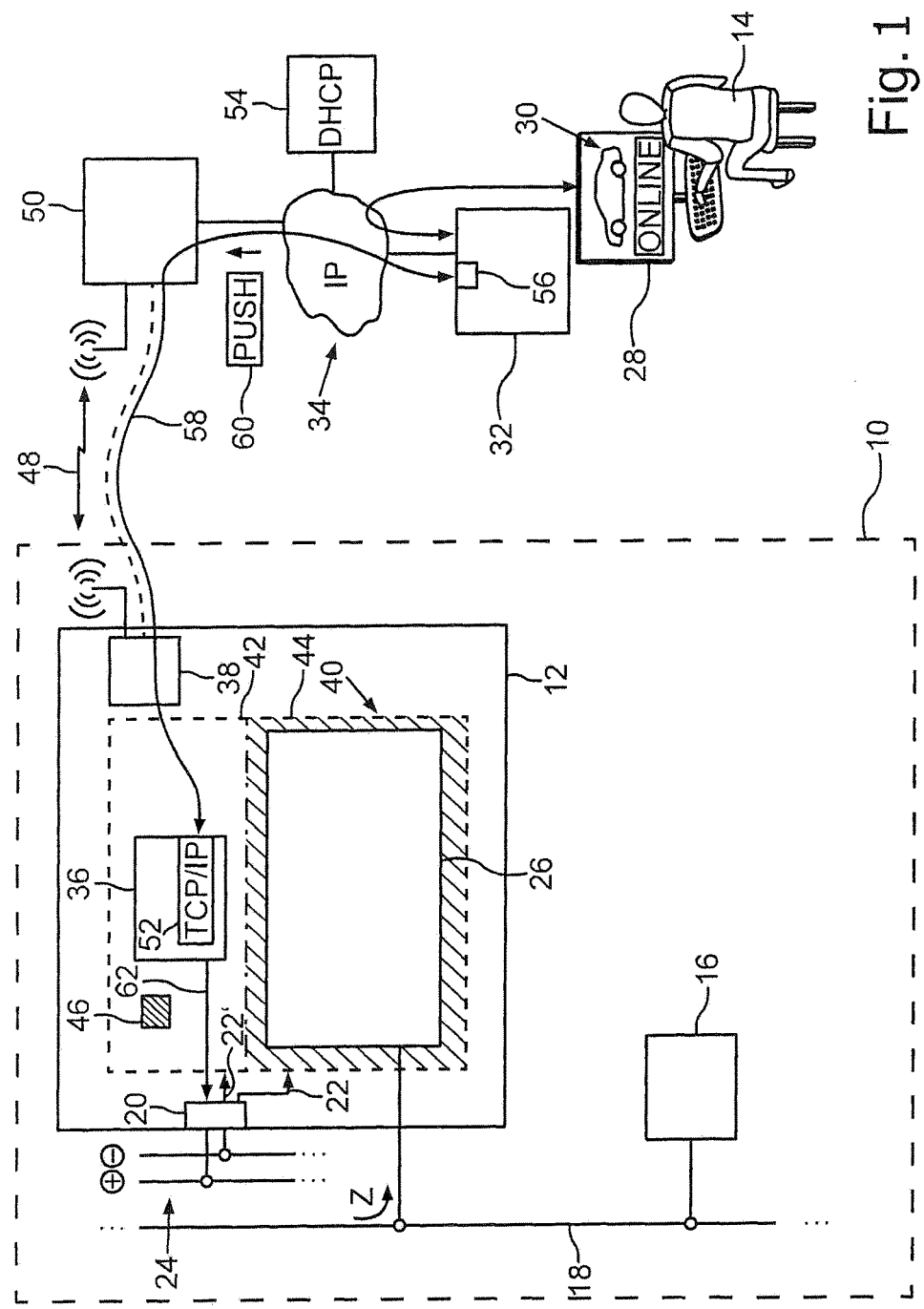

(51) Int. Cl.
*H04W 4/04* (2009.01)
*H04W 4/20* (2018.01)
*H04L 29/12* (2006.01)
*B60R 25/20* (2013.01)
*G06F 1/32* (2006.01)

(52) U.S. Cl.
CPC ........ *G06F 1/3209* (2013.01); *H04L 61/2015* (2013.01); *H04L 67/025* (2013.01); *H04L 67/125* (2013.01); *H04W 4/046* (2013.01); *H04W 4/20* (2013.01)

(56) References Cited

U.S. PATENT DOCUMENTS

| | | | |
|---|---|---|---|
| 8,064,960 B2 | 11/2011 | Wisnewski et al. | |
| 8,527,015 B2 | 9/2013 | Atrabady et al. | |
| 8,682,401 B2 | 3/2014 | Ebner et al. | |
| 8,897,952 B1* | 11/2014 | Palmer | H04L 67/12 701/29.1 |
| 2004/0127206 A1 | 7/2004 | Van Bosch et al. | |
| 2006/0095174 A1* | 5/2006 | Sonnenrein | B60R 16/02 701/31.5 |
| 2008/0108335 A1* | 5/2008 | Jamali | H04M 3/51 455/414.3 |
| 2008/0208405 A1* | 8/2008 | Alrabady | G08G 1/096811 701/36 |
| 2010/0099396 A1* | 4/2010 | Huq | H04L 67/125 455/420 |
| 2010/0164790 A1 | 7/2010 | Wisnewski et al. | |
| 2012/0030512 A1* | 2/2012 | Wadhwa | H04L 67/12 714/23 |
| 2012/0256763 A1* | 10/2012 | Johnson | G08C 17/02 340/870.07 |

FOREIGN PATENT DOCUMENTS

| | | |
|---|---|---|
| DE | 102006024634 A1 | 11/2007 |
| DE | 102007052019 A1 | 6/2008 |
| DE | 112008000461 T5 | 5/2010 |
| DE | 102009038431 A1 | 2/2011 |
| KR | 20130042217 A | 4/2013 |

OTHER PUBLICATIONS

Delphi, Body Control Module, 2008, https://www.delphi.com/docs/default-source/old-delphi-files/9483593e-ef22-44cc-9501-cfa5c77f9311-pdf.*

International Search Report and Written Opinion directed to related International Patent Application No. PCT/EP2015/000808, with attached English-language translation, dated Jul. 16, 2015; 23 pages.

International Preliminary Report on Patentability directed to related International Patent Application No. PCT/EP2015/000808, with attached English-language translation, dated Apr. 29, 2016; 19 pages.

"Socket (Software)," Wikipedia article, last accessed Feb. 12, 2015, with attached English-language translation; 12 pages.

English-language abstract of Chinese Patent Application Publication No. 102955453 A, published Mar. 6, 2013; 1 page.

English-language abstract of Korean Patent Application Publication No. 20130042217 A, published Apr. 26, 2013; 1 page.

English-language Abstract of German Patent Application Publication No. 102009038431 A1, published Feb. 24, 2011; 1 page.

* cited by examiner

REMOTE CONTROL OF A MOTOR VEHICLE DURING A PARKED PHASE

TECHNICAL FIELD

The invention relates to a control unit for a motor vehicle as well as to a method for setting or controlling the motor vehicle from a control server of the Internet, while the motor vehicle is parked. In the parked phase, the ignition of the motor vehicle is switched off, so that electrical devices of the motor vehicle are supplied with electrical energy exclusively via an electrical energy storage device of the motor vehicle, for example, a battery.

BACKGROUND

Nevertheless, nowadays it is desirable that a motor vehicle offers a so-called remote service or remote control service in the parked phase as well, by means of which the motor vehicle can be configured or, in general, controlled from outside, for example, via the Internet. Thus, it is necessary to ensure that the motor vehicle reacts to control commands from outside.

For such remote services, control units according to CN 102 955 453 A remain permanently logged into a mobile radio network and wait for incoming Short Message Service (SMS) messages or an incoming call. However, this can be associated with an undesirably long latency time. In addition, it can happen that a user transmits a setting command to the motor vehicle and then it turns out subsequently that the motor vehicle is parked in a dead spot and the setting command does not arrive at all.

In DE 10 2006 024 634 B4, a method for wireless transmission of infotainment data between a vehicle network and a network outside the vehicle is described. The vehicle network has a ready-to-receive state and a rest state, wherein a switch from the rest state into the ready-to-receive state is carried out via a remote control of the vehicle. This method for switching between the rest state and the ready-to-receive state, which is known from the prior art, is based on a separate receiver which can generate a wake-up signal in the motor vehicle. This leads to an undesirably complicated circuitry.

In DE 10 2007 052 019 A1, a motor vehicle is described, the telematics unit of which can also be operated with the vehicle ignition switched off, in order to receive a message via a mobile radio connection. If the unit is in a standby mode, it is activated for retrieving the message. It can maintain an Internet connection, in order to be controlled from a call center, when the telematics unit activated.

In DE 11 2008 000 461 T5, a motor vehicle is described, which comprises both a radio key receiver and also a wireless local area network (WLAN) receiver. With the ignition of the motor vehicle switched off, the WLAN receiver is also switched off. In order to be able to transmit a message to the motor vehicle, the radio key receiver must be controlled by means of a radio key, so that said radio key receiver switches the WLAN receiver on.

SUMMARY

It is the object of the invention to provide a remote service with low latency in a motor vehicle during a parked phase.

The object is achieved by the subject matters of the independent claims.

Advantageous developments of the invention result from the features of the dependent claims.

According to the invention, a control unit is provided for the motor vehicle, which is designed to switch off a main module upon reception of an ignition-off signal transmitted in the motor vehicle for initiating the parked phase. Here, a main module is understood to mean a circuitry area of the control unit that is provided to be operated in the driving mode of the motor vehicle, that is to say when the ignition is switched on. For switching off, the main module in the control unit is, for example, switched off or disconnected from the on-board electrical network. The ignition-off signal can be, for example, a digital signal, which represents a terminal 15 signal as defined in the German industry standard DIN 72552. Accordingly, in the parked phase, by switching off the ignition, a drive motor of the motor vehicle is switched off, for example, an internal combustion engine or an electric motor, and the described control unit is operated exclusively with electrical energy from a vehicle battery of the motor vehicle.

In order to provide the remote service nonetheless, a mobile radio module is provided in the control unit, which is designed to remain logged into a mobile radio network when the main module is switched off. In other words, the mobile radio module can be identified in the mobile radio network via a Subscriber Identity Module (SIM) and it can be addressed or contacted from the mobile radio network. Moreover, an auxiliary processor device is provided in the control unit, which is designed to reserve an Internet address on an address server of the Internet via the mobile radio module, and to store this Internet address on a control server of the Internet, which is designed for the remote control of the motor vehicle. For this purpose, a valid Internet address is communicated to the control server by the auxiliary processor device. The control server can provide, for example, an Internet service, which can be addressed by a user of the motor vehicle via the Internet, for example, for programming a parking heater of the motor vehicle.

As a result of reserving the Internet address, not only does the control unit remain accessible via a SIM identification number from the mobile radio network, but additionally it is also possible to communicate via the Internet address or Internet Protocol (IP) address via the mobile radio module from the control server of the Internet with the auxiliary processor device.

The invention results in the advantage that, by providing an Internet address on the control server, control data can be transmitted from the control server with low latency to the auxiliary processor device. The communication channels needed for this purpose are already permanently provided beforehand by logging in of the mobile radio module and reserving the Internet address.

The invention provides that the auxiliary processor device is designed to receive a wake-up command from the control server and to switch the main module on via a wake-up line as a function of the wake-up command. As a result, during the parked phase, a function of the main module can be activated by remote control. The wake-up line can be implemented, for example, by an I2C communication line (I2C inter-integrated circuit). In order to wake up or switch on the main module, it is provided that the auxiliary processor device controls a power supply of the control device, so that, through the power supply, a supply line is electrically connected to an on-board electrical network for the electrical supply of the main module.

Here, it is provided particularly preferably that the auxiliary processor device is designed to store the Internet address on the control server by generating an IP socket. This results in a particularly low latency time.

Preferably, the processor device is designed to receive, via an Internet connection set up by means of the mobile radio module, control data transmitted by the control server without having been requested. Such control data can be generated, for example, by means of a PUSH protocol, for example, an Hypertext Transfer Protocol (HTTP) server push. This results in the advantage that the control unit can be operated particularly energy efficiently, since it only needs to become active when control data are received.

The control unit according to the invention can be operated differently with special advantages in each case in the motor vehicle.

An embodiment provides that the control unit is designed to transmit, as gateway, communication data between the control server and a communication bus of the motor vehicle. This results in the advantage that, by means of the control server, devices other than the control unit according to the invention can also be controlled.

Another embodiment provides that the auxiliary processor device is designed to receive update data from the control server and, on the basis of the update data, to carry out an updating of the operating software of the main module. Since this occurs during the parked phase with the main module switched off, the operating software can be run without negatively affecting the operation itself of the main module, so that this does not entail any limitation of user benefit.

Another embodiment provides that the control device is designed to start, as a function of a start command of the control server, at least one other control unit of the motor vehicle via a communication bus. As communication bus, a Controller Area Network (CAN) bus can be provided, for example. The other control unit can be, for example, an alarm system or a motor control unit of the motor vehicle. In this manner, an alarm can be triggered in the motor vehicle via the control server, or, for example, a combustion engine can be started, in order to protect the motor vehicle from freezing when the temperature has dropped below a predetermined threshold value.

Another embodiment provides that the control unit is designed to program a parking heater of the motor vehicle, as a function of configuration data of the control server. Then, in the already described manner, a user can set, for example, from a home computer, the parking heater in the motor vehicle via the control server.

Another embodiment provides that the control unit is designed to unlock a central locking system of the motor vehicle. This results in the advantage that, for example, after a user has lost a key, the motor vehicle can be unlocked by an unlocking command.

The communication data, the update data, the configuration data, the wake-up command, the start command, and the unlocking command are here also referred to in general as control data.

It is provided particularly preferably that the control unit is designed as an infotainment system. Then, a plurality of functionalities are available to the control unit with the main module, functionalities which can now also be remote controlled according to the invention during the parked phase via the control server with little effort.

Also part of the invention is a motor vehicle that is characterized in that it has an embodiment of the control unit according to the invention. The motor vehicle according to the invention is designed preferably as a car, in particular as a passenger car.

Also part of the invention is a method for the remote control of a motor vehicle during a parked phase of the motor vehicle, in which, in the motor vehicle, in a control unit whose main module, that is to say a circuitry area provided for operation with ignition switched on, has been switched off. In the control unit, during the parked phase, a mobile radio module remains logged into a mobile radio network, and an auxiliary processor device reserves an Internet address on an address server of the Internet via the mobile radio network, Internet address which is provided on a control server of the Internet. As a result, the control server can transmit control data to the auxiliary processor device in the described manner, with low latency. The invention provides that the auxiliary processor device receives a wake-up command from the control server and switches the main module on via a wake-up line as a function of the wake-up command. As a result, during the parked phase, a function of the main module can be activated by remote control. The wake-up line can be implemented, for example, by an I2C communication line (I2C inter-integrated circuit). In order to wake up or switch on the main module, it is provided that the auxiliary processor device controls a power supply of the control device, so that, through the power supply, a supply line is electrically connected to an on-board electrical network for the electrical supply of the main module.

For a user of the motor vehicle to be able to verify, beforehand and outside, for example, from the user's home computer, whether the motor vehicle is ready to receive control data, a development of the method provides that the control server generates a status display that can be retrieved via the Internet, and that indicates whether the motor vehicle is currently providing the Internet address. The user can then find out whether he can carry out a setting on his motor vehicle via the control server without delay.

Also part of the invention are developments of the method according to the invention that have features that have already been described in connection with the developments of the control unit according to the invention. For that reason, a description of the corresponding developments of the method according to the invention is omitted here.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

Below, an embodiment example of the invention is described. For this purpose, the single figure (FIG. 1) shows a diagrammatic representation of an embodiment of the motor vehicle according to the invention.

DETAILED DESCRIPTION

The embodiment example explained below is a preferred embodiment of the invention. However, in the embodiment examples, the described components of the embodiment in each case represent individual features of the invention which in each case, independently of one another, develop the invention and which thus should be considered as part of the invention alone or a combination other than that which is shown. Moreover, the described embodiment can also be completed by other features among the features that have already been described.

In FIG. 1, a control unit 12 of a motor vehicle 10 is shown, which is a possible embodiment of the control unit according to the invention. The motor vehicle 10 can be, for example, a car, in particular a passenger car. The motor vehicle 10 has been parked by a user 14, for example, it has been parked in a garage, the ignition has been switched off, and the motor vehicle has been locked.

An ignition of the motor vehicle 10 is switched off, and the control unit 12 and other control units, of which a control unit 16 is represented as an example in FIG. 1, are in a rest mode or in a standby mode. For this purpose, in order to initiate the parked phase, an ignition-off signal Z has been transmitted, for example, via a communication bus 18, which can be a CAN bus, for example, to the control units 12, 16. In the control unit 12, in response to the ignition-off signal Z from a power supply 20, a supply line 22 can have been disconnected from an on-board electrical network 24 of the motor vehicle 10. As a result, a main module 26 of the control unit 12 can have been switched off.

The control unit 12 can be an infotainment system, for example. The main module 26 can then comprise, for example, a processor for providing a radio function and/or a navigation function and/or a media playback function, for example, an MP3 playback function.

Nevertheless, in the motor vehicle 10, the user 14 can carry out a configuration in the parked and switched off motor vehicle 10 from home via a smartphone or a home computer 28, for example. On the home computer 28, a status display 30 is displayed for the user 14, indicating to him that he can access the motor vehicle 10, that is to say that the motor vehicle 10 is ready for receiving data.

The status display can have been generated by a control server 32, which can have been retrieved by the user 14 on the home computer 28 via the Internet 34. For this purpose, an Internet connection from the home computer 28 to the control server 32 can have been set up.

For the motor vehicle 10 to remain configurable via the Internet 34 by means of the control server 32, not every component is switched off in the control unit 12 during the parked phase. In the control unit 12, an auxiliary processor device 36 and a mobile radio module 38 can also be in operation during the parked phase. The auxiliary processor device 36 can comprise, for example, its own processor, which is different from the main module 26. It is also possible to provide that the auxiliary processor device 36 is designed as component of the mobile radio module 38. It is also possible to provide that the main module 26 and the auxiliary processor device 36 are arranged on a common printed circuit board 40 and that the printed circuit board 40 is subdivided, for example, into two power domains 42, 44 which can be connected by separate supply lines 22, 22' to the power supply 20. Then, the main module 26 can be switched off, while the auxiliary processor device 36 can continue to be in operation. The auxiliary processor device 36 can be provided, for example, by its own processor chip, wherein, even if the auxiliary processor device 36 is operated, additional components 46 of the chip can be switched off, for example, by means of a current saving mode. It is also possible to provide that, in the processor chip, a processor cycle rate is reduced.

The mobile radio module 38 can comprise, for example, a GSM module, UMTS module and/or LTE module. The mobile radio module 38 can be designed to remain logged or signed into a mobile radio network 50 via a radio connection 48 during the parked phase with the main module 26 switched off, so that mobile radio data can be transmitted from the mobile radio network 50 via the radio connection 48 to the mobile radio module 38, without the mobile radio module 38 having to identify itself again beforehand.

The auxiliary processor device 36 can then set up an Internet connection with a control server 32, via the mobile radio module 38 and the mobile radio network 50. This can be implemented, for example, in that, in the auxiliary processor device 36, a Transmission Control Protocol/Internet Protocol (TCP/IP) stack 52 is provided, and an IP address for the TCP/IP stack is retrieved or downloaded from an address server 54, for example, a Dynamic Host Configuration Protocol (DHCP) DHCP server. The Internet address can be used by the auxiliary processor device 36, for example, for generating an IP socket on the control server 32. Via the IP socket 56, control data can then be sent through a TCP/IP stack (not shown here) of the control server 32 via an Internet connection 58 to the auxiliary processor device 36. For this purpose, it is also preferable that there also is no need for a further request by the auxiliary processor device 36, that is to say the control server 32 can, without request, for example, by means of a PUSH command 60, transmit the control data, for example, configuration data, update data, communication data, a start command, an unlocking command, or a wake-up command, to the auxiliary processor device 36.

The user 14 can control from his home computer 28 which data the control server 32 transmits here as PUSH data 60. In this way, he can, for example, program a parking heater, in that a configuration command is generated at an operating interface of the home computer 28, and the configuration command is transmitted by the control server 32 to the auxiliary processor device 36, which then can transmit the configuration command, for example, via the home computer 28, for example, to the control unit 16, wherein, in this case, the control unit 16 is then designed for the control of the parking heater.

It is also possible to provide that the auxiliary processor device 36 does not control the bus communication directly, but that a wake-up line 62 is provided, by means of which the auxiliary processor device 36 can activate the power supply 28, which can then again connect the supply line 22 to the on-board electrical network 24, for example, so that the main module 26 is switched on. Then, the main module 26 can carry out the bus communication, for example.

Overall, in the motor vehicle 10, the built-in telephone thus remains logged into the network of the mobile radio provider, and an auxiliary processor device with application software remains active. In this way, a connection with the control server 32 can be maintained, for example, via the HTTP protocol. By means of a PUSH command 60, the control unit 12 can then be woken up. Here, it is particularly advantageous if the control unit 12 is an infotainment control unit.

However, in the described manner, the infotainment control unit is largely switched off here. Only the telephone module, that is to say the mobile radio module 38, and the application processor are partially active, so that the auxiliary processor device 36 and the mobile radio module 38 are available. Even in the case of the application processor, some parts or components 46, such as, for example, a main processor, a Graphical Processing Unit (GPU), an interface for PCI and SATA, are preferably switched off.

Running on the application processor is an application that maintains the server connection 58 and that, in the case of a request of the server, for example, thus the PUSH command 60, can inform the power management of the power supply 20.

A wake-up line 62, which can be implemented as a I2C communication line, runs from the application processor to the processor for the power management, which can be provided, for example, in the on-board electrical network 24. By means of this line, the rest of the control unit 12 can be woken up.

Thus, the infotainment control unit can be updated remotely, that is to say it can be maintained remotely. The infotainment control system can also be used as gateway for vehicle services. From the infotainment control system, the vehicle at rest can then be woken up, and, for example, the vehicle can be unlocked and a parking heater can be programmed. Before waking up the infotainment control unit, the control server knows whether this unit can be accessed at all, and it can display this ahead of time to the user 14, for example, on a smartphone App or a web interface. The waking up of the infotainment control unit occurs more rapidly than, for example, via SMS, since there are no latency times in the network, provider and SMS gateway.

Overall, the example shows how an infotainment control unit can be woken up by means of the invention via an Internet protocol.

The invention claimed is:

1. A control unit for a motor vehicle, comprising:
a main module configured to be powered on when an ignition of the motor vehicle is powered on;
a radio transceiver configured to remain logged into a mobile radio network when the main module is powered off; and
an auxiliary processor configured to:
receive, using the radio transceiver, an Internet address from an address server connected to the Internet;
transmit, using the radio transceiver, the Internet address to a control server connected to the Internet, wherein the control server is configured to store the Internet address for remote control of the motor vehicle;
receive, using the radio transceiver, a wake-up command from the control server based on the Internet address;
power on the main module based on the wake-up command, wherein the powering on the main module comprises:
activating a power supply via a wake-up line, wherein the activating the power supply comprises connecting a power supply line to an on-board electrical network that supplies power to the main module; and
wherein the control unit is configured to:
power off the main module in response to receiving an ignition-off signal, wherein the ignition-off signal is generated in response to initiating a parked phase for the motor vehicle.

2. The control unit of claim 1, wherein the control server generates an Internet Protocol (IP) socket based on the Internet address.

3. The control unit of claim 1, wherein the auxiliary processor is configured to receive, via an Internet connection established between the radio transceiver and the control server, control data transmitted by the control server without having been requested by the auxiliary processor.

4. The control unit of claim 1, wherein the control unit is configured to transmit, as a gateway, communication data between the control server and a communication bus of the motor vehicle.

5. The control unit of claim 1, wherein the auxiliary processor is configured to:
receive update data from the control server; and
update operating software of the main module based on the update data.

6. The control unit of claim 1, wherein the control unit is configured to start an additional control unit of the motor vehicle using a communication bus based on a start command from the control server.

7. The control unit of claim 1, wherein the control unit is configured to program a parking heater of the motor vehicle based on configuration data from the control server.

8. The control unit of claim 1, wherein the control unit is configured to unlock a central locking system of the motor vehicle based on an unlocking command from the control server.

9. The control unit of claim 1, wherein the control unit is an infotainment system.

10. The control unit of claim 1, wherein the radio transceiver comprises a Global System for Mobile communication (GSM) transceiver, a Universal Mobile Telecommunications Service (UMTS) transceiver, or a Long-Term Evolution (LTE) transceiver.

11. The control unit of claim 1, wherein the auxiliary processor is further configured to:
receive the wake-up command from the control server based on a PUSH command.

12. The control unit of claim 1, wherein the auxiliary processor is further configured to:
receive control data from the control server based on a PUSH command, wherein the control data comprises configuration data, update data, communication data, a start command, or an unlocking command.

13. The control unit of claim 1, wherein the radio transceiver is further configured to:
receive a Short Message Service (SMS) command via the mobile radio network when the main module is powered off.

14. The control unit of claim 1, wherein the auxiliary processor is further configured to:
receive, using the radio transceiver, the Internet address from the address server connected to the Internet via the mobile radio network;
transmit, using the radio transceiver, the Internet address to the control server connected to the Internet via the mobile radio network; and
receive, using the radio transceiver, the wake-up command from the control server via the mobile radio network based on the Internet address.

15. A method for remote control of a motor vehicle during a parked phase of the motor vehicle, the method comprising:
switching off an ignition of the motor vehicle;
powering off a main module of a control device of the motor vehicle based on the switching off the ignition of the motor vehicle;
maintaining a network connection between a radio transceiver of the control device and a mobile radio network;
receiving, using the radio transceiver, an Internet address from an address server connected to the Internet via the mobile radio network;
transmitting, using the radio transceiver, the Internet address to a control server connected to the Internet via the mobile radio network, wherein the control server is configured to store the Internet address for remote control of the motor vehicle;
receiving, using the radio transceiver, a wake-up command from the control server;

powering on the main module based on the wake-up command, wherein the powering on the main module comprises:
activating a power supply of the control unit via a wake-up line, wherein the activating the power supply comprises connecting a power supply line to an on-board electrical network that supplies power to the main module.

16. The method according to claim 15, wherein the control server generates a status display that can be retrieved via the Internet, wherein the status display indicates whether the motor vehicle is currently providing the Internet address.

17. The method according to claim 15, further comprising:
receiving, via an Internet connection established between the radio transceiver and the control server, control data transmitted by the control server without having been requested.

18. The method according to claim 15, further comprising:
receiving update data from the control server; and
updating operating software of the main module based on the update data.

19. The method according to claim 15, wherein the receiving the wake-up command further comprises:
receiving the wake-up command from the control server based on a PUSH command.

20. The method according to claim 15, further comprising:
receiving control data from the control server based on a PUSH command, wherein the control data comprises configuration data, update data, communication data, a start command, or an unlocking command.

21. A motor vehicle comprising:
a control unit, the control unit comprising:
a main module configured to be powered on when an ignition of the motor vehicle is powered on;
a radio transceiver configured to remain logged into a mobile radio network when the main module is powered off; and
an auxiliary processor configured to:
receive, using the radio transceiver, an Internet address from an address server connected to the Internet via the mobile radio network;
transmit, using the radio transceiver, the Internet address to a control server connected to the Internet via the mobile radio network, wherein the control server is configured to store the Internet address for remote control of the motor vehicle;
receive, using the radio transceiver, a wake-up command from the control server;
power on the main module based on the wake-up command, wherein the powering on the main module comprises:
activating a power supply via a wake-up line, wherein the activating the power supply comprises connecting a power supply line to an on-board electrical network that supplies power to the main module; and
wherein the control unit is configured to;
power off the main module in response to receiving an ignition-off signal, wherein the ignition-off signal is generated in response to initiating a parked phase for the motor vehicle.

* * * * *